N. L. TOLVSTAD.
SYSTEM OF ELECTRICAL SELECTION.
APPLICATION FILED AUG. 16, 1907.

1,108,028.

Patented Aug. 18, 1914.

6 SHEETS—SHEET 1.

WITNESSES
F. C. Barry
Edw. W. Byrn

INVENTOR
NELSON L. TOLVSTAD
BY Munn & Co.
ATTORNEYS.

N. L. TOLVSTAD.
SYSTEM OF ELECTRICAL SELECTION.
APPLICATION FILED AUG. 16, 1907.

1,108,028.

Patented Aug. 18, 1914.

6 SHEETS—SHEET 3.

WITNESSES
H. C. Barry
Edw. U. Byrn.

INVENTOR
NELSON L. TOLVSTAD
BY Munn & Co.
ATTORNEYS

N. L. TOLVSTAD.
SYSTEM OF ELECTRICAL SELECTION.
APPLICATION FILED AUG. 16, 1907.

1,108,028.

Patented Aug. 18, 1914.
6 SHEETS—SHEET 4.

WITNESSES
F. C. Barry
Edw. W. Byrn

INVENTOR
NELSON L. TOLVSTAD
BY Munn & Co.
ATTORNEYS

N. L. TOLVSTAD.
SYSTEM OF ELECTRICAL SELECTION.
APPLICATION FILED AUG. 16, 1907.
1,108,028.
Patented Aug. 18, 1914.
6 SHEETS—SHEET 5.
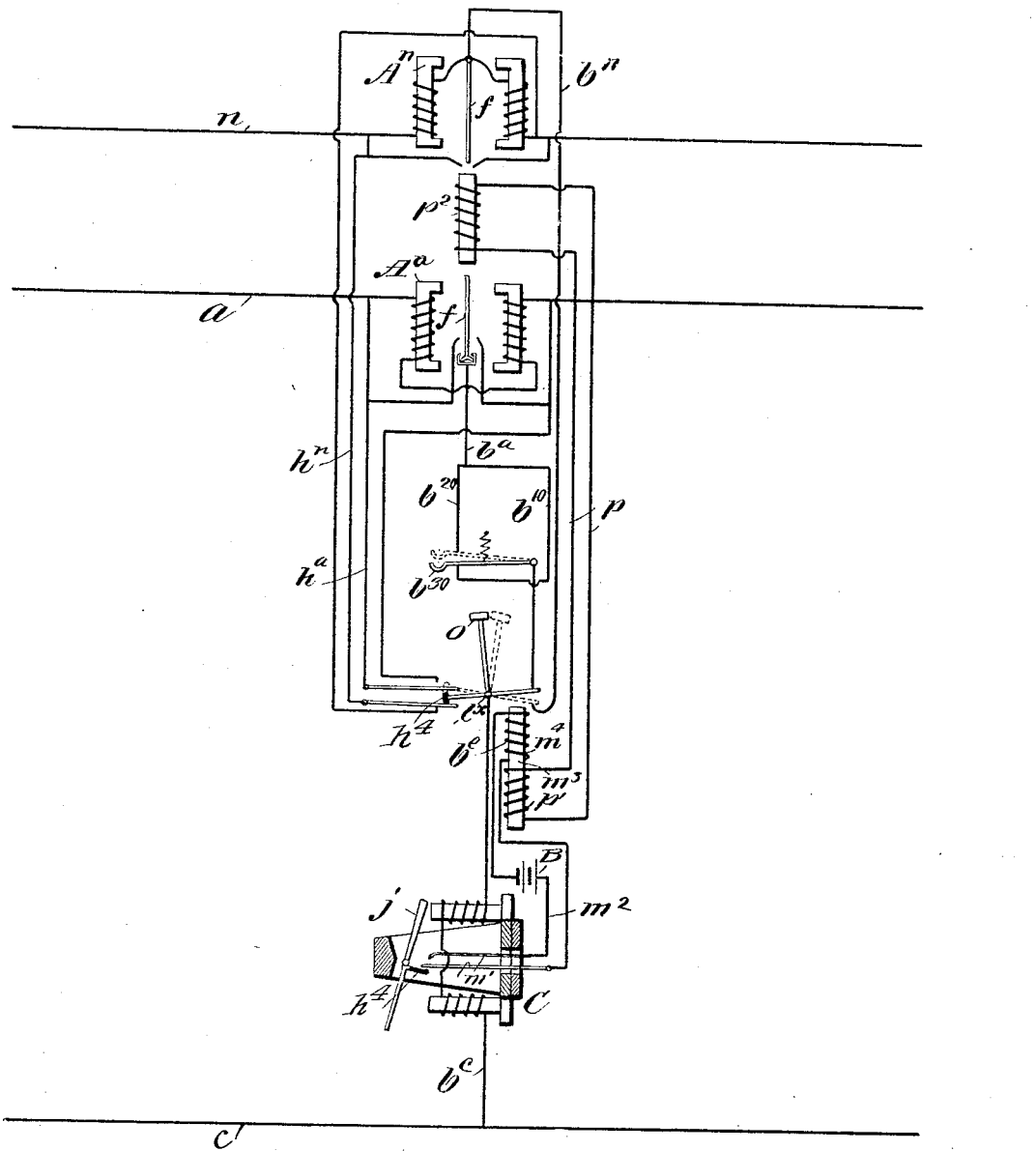
WITNESSES
F. C. Barry
Edw. W. Byrn
INVENTOR
NELSON L. TOLVSTAD
BY Munn & Co.
ATTORNEYS

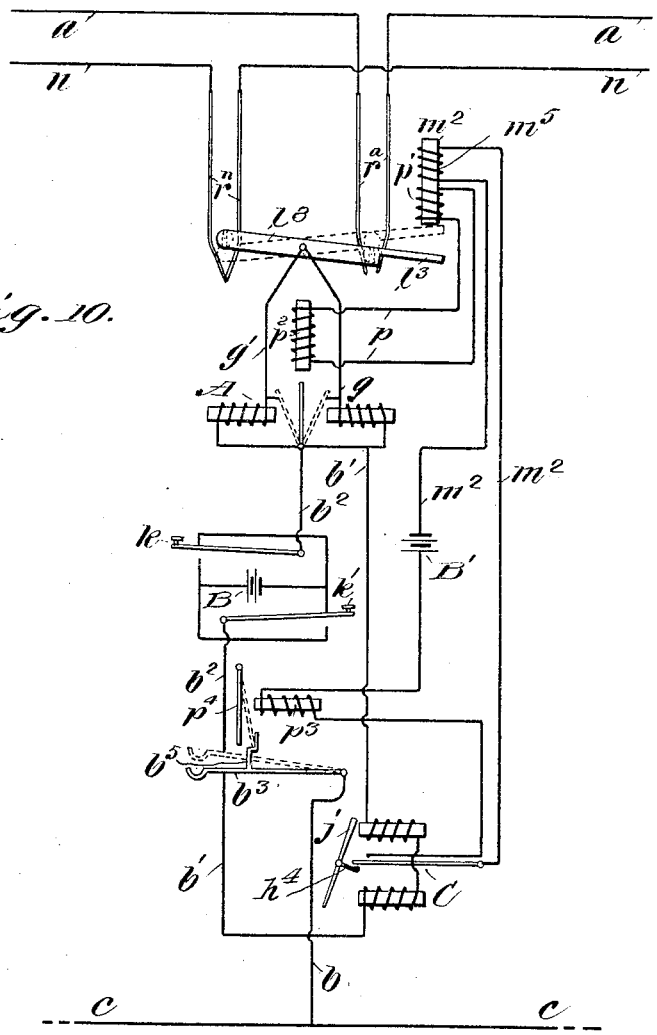

UNITED STATES PATENT OFFICE.

NELSON L. TOLVSTAD, OF GROTON, SOUTH DAKOTA.

SYSTEM OF ELECTRICAL SELECTION.

1,108,028.      Specification of Letters Patent.      Patented Aug. 18, 1914.

Continuation of application Serial No. 339,743, filed October 20, 1906. This application filed August 16, 1907. Serial No. 388,914.

*To all whom it may concern:*

Be it known that I, NELSON L. TOLVSTAD, a citizen of the United States, and resident of Groton, in the county of Brown and State of South Dakota, have invented an Improved System of Electrical Selection, of which the following is a specification.

My invention relates to a system of electrical selection, of which the main features consist, first, of an electrical circuit comprising two main branches connected transversely at intervals by a plurality of cross shunts, one of such main branches at its junction with each of said cross shunts being provided with resistances, confining the flow of the current to any desired part of such circuit; second, the connection of a suitable current source to each of the said cross shunts and means for directing the current to either side of such circuit, as well as means for cutting out intervening cross shunts, together with their respective resistances in the main circuit between applied current source and the point of the circuit such current is desired to reach; third, the means for restoring the circuit, or the part of the same which has been employed, to its condition of rest.

In my invention, hereinafter described, claimed and shown in the accompanying drawings, which are mostly diagrammatical in their nature and in which corresponding parts are indicated by the same characters of reference throughout the several figures, I do not wish to be limited to the exact form, proportions, or mode of combination as may be described or shown, but reserve the right to make such changes, uses and combinations of the different parts of the same as do not depart from the spirit of the invention and the scope of the appended claims will allow.

Figure 1:
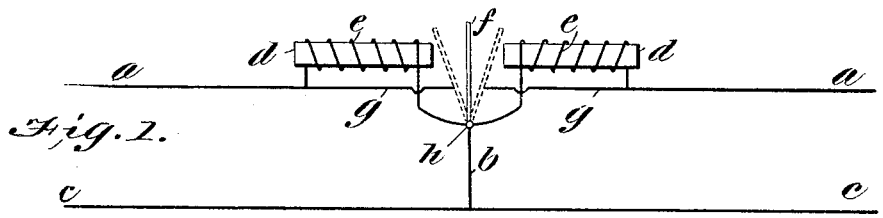
Figure 2:
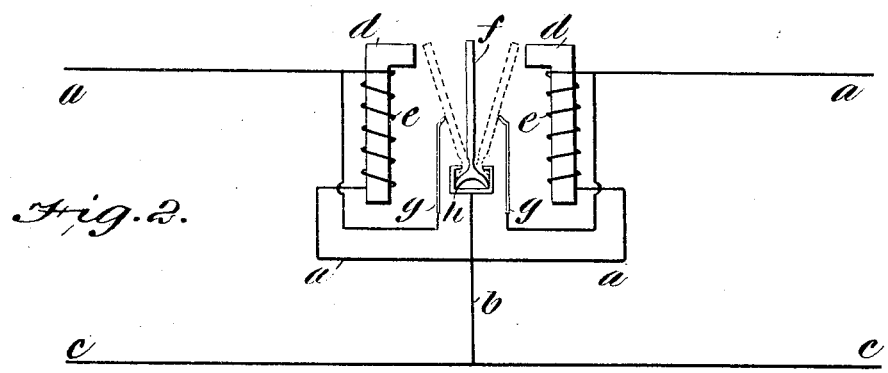
Figure 3:
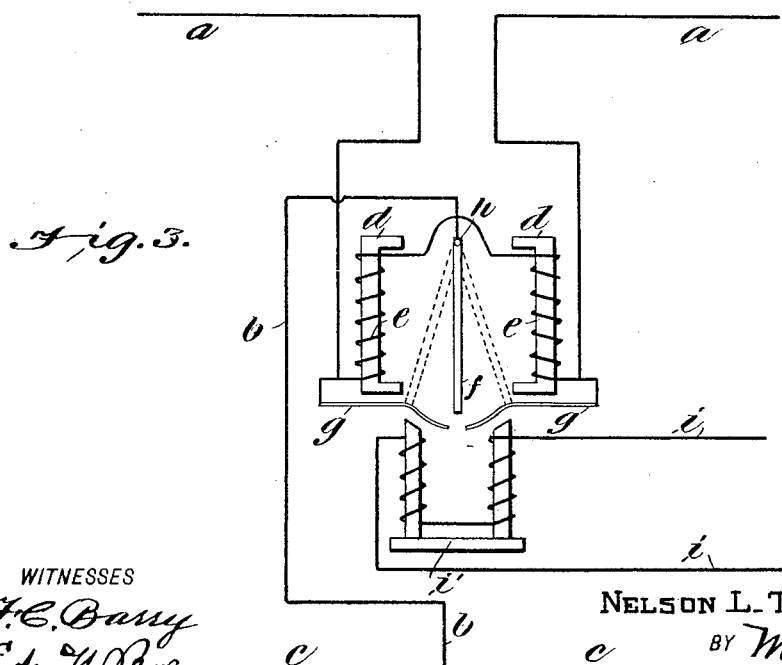
Figure 4:
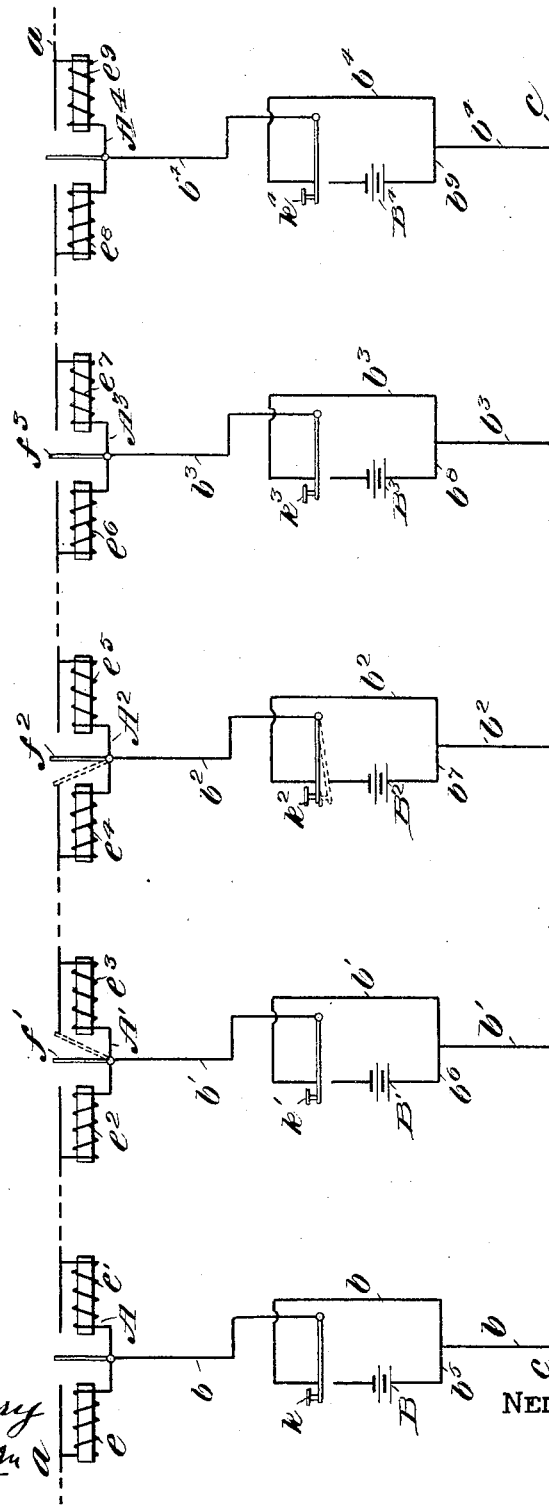
Figure 5:
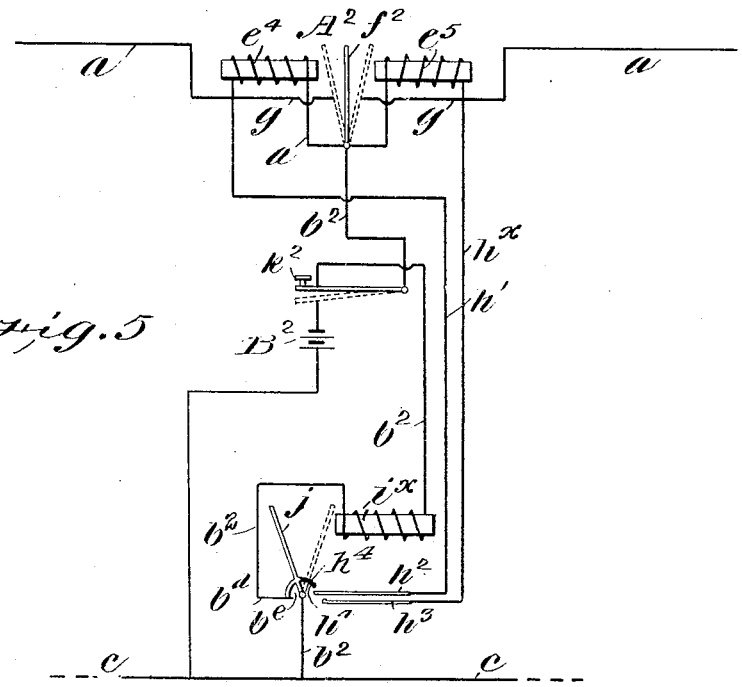
Figure 6:
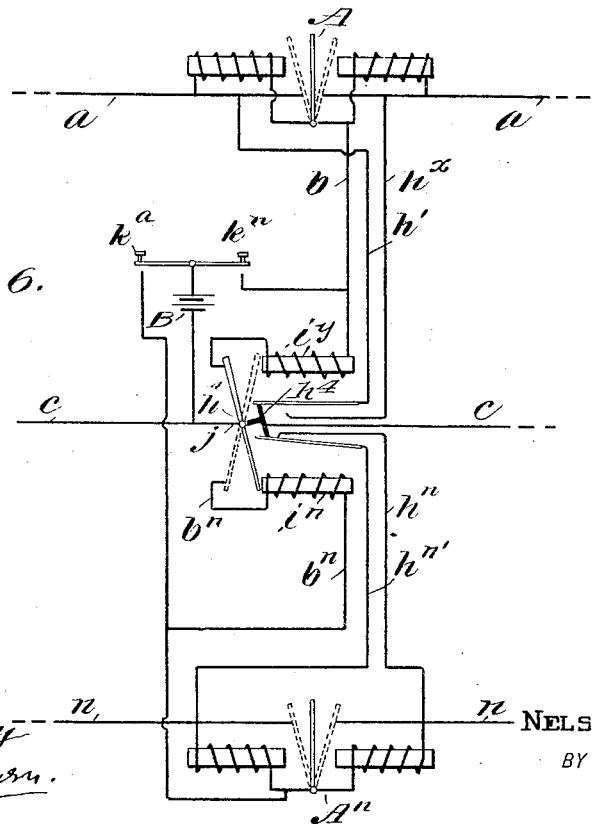
Figure 7:
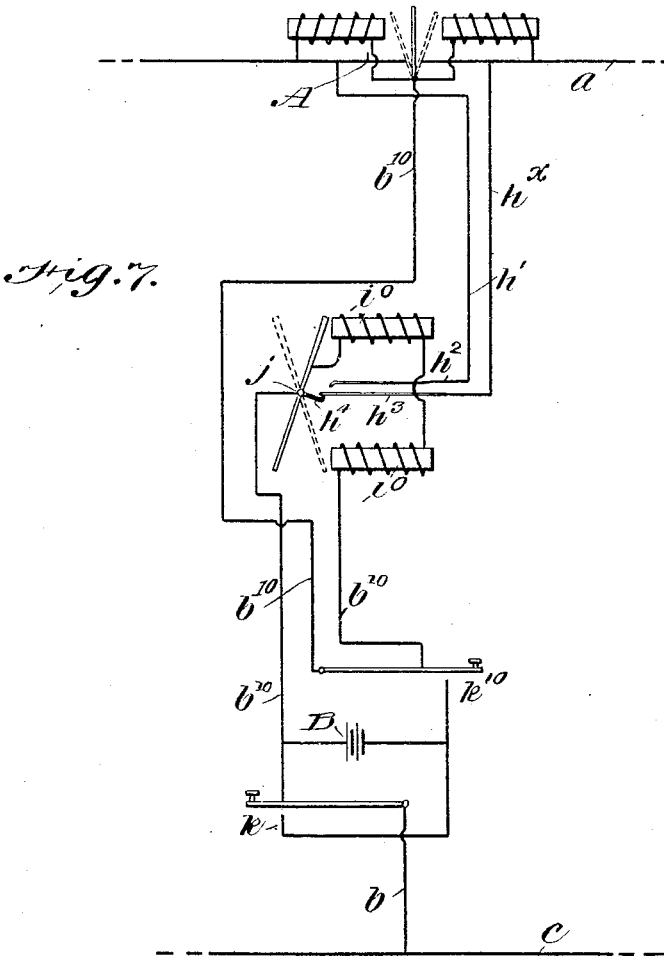
Figure 8:
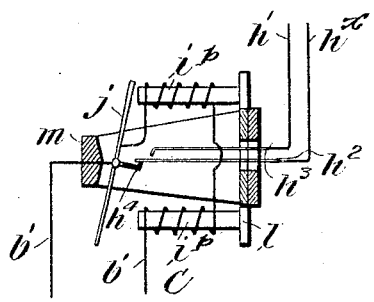

In the drawings, Figures 1, 2 and 3 show diagrams of different forms of a main circuit combined with resistances and automatic shunting devices. Fig. 4 is a diagram showing fundamental principles. Fig. 5 is a diagram showing one of the cross shunts of a circuit and its connections, opened or cut out by an inductively operated switch with currents of either polarity. Fig. 6 shows a part of a circuit in which one of the main branches consists of a couple of conductors and a cross shunt from each member alternating with each other in their connection with the other main branch of the circuit to which one of the said members restores the other. Fig. 7 shows one of the cross shunts the same as Fig. 5, but employing a polarized switching device and is provided with pole changing circuit and current transmitting keys. Fig. 8 shows the polarized switching device. Fig. 9 is a diagram showing a portion of a circuit employing two conductors for one of the main branches, alternating with each other through their respective cross shunts in their connection with the other main branch, like Fig. 6, but employing a polarized switching device. In Fig. 10 is shown the two members of the couple with a single cross shunt, common to both, switched from one to the other of the said members, and one restoring the other. Fig. 10$^a$ is a detailed view of the relay operated switching or contact lever and its connections.

In an electric circuit as mentioned and hereafter described (consisting of two main branches connected by any number of cross shunts) one of the cross shunts is shown at $b$, Figs. 1, 2 and 3, together with the adjacent parts of the main branches $a$ and $c$ to which the terminals of such cross shunt $b$ are connected in connection with an impedance or resistance coil in the circuit of the main branch $a$ on each side of its junction with the cross shunt $b$; such pair of resistance coils $e$ $e$, one on each side of the cross shunt $b$, is wound for equal resistance upon the soft iron cores $d$ $d$ between which is placed a swinging or vibrating soft iron armature $f$. The said soft iron cores $d$ $d$ with their coils $e$ $e$ and the terminal contact points of the same, have a different relative position to that of its armature $f$ in the three diagrams shown, but the functions and operations of each are essentially the same for the three forms of such resistance device as therein shown. The form of the said resistance device shown by Fig. 1 is simple and readily understood, and from which the operations of the other two forms of said device will be understood, the same letters referring to the same parts in each.

The armature $f$ is electrically connected to the main branch $a$ at any point of the same between the two coils $e$ $e$ at its lower end, which also serves as its pivotal part or center of motion in its vibrations between the two oppositely placed cores $d$ $d$. When that part of the circuit in which such resistance device is located is at rest, the armature $f$ should occupy its middle or perpendicular position as shown, to which position it is restored after each time it has been in use, by means which will be shown later; and one method employed to make the middle position of said armature $f$ stable, is shown in Fig. 2, and which will be further explained. In its extreme positions on either side of the perpendicular, as indicated by dotted lines, the armature $f$ is held by its weight against the terminals of the short branches $g$ $g$ on either side. From this it will now be apparent that the armature $f$, when thrown over into either of its extreme positions, its contact with the short branch $g$, and its connection at its lower end to the shunt $b$, short circuits the coil $e$ in the main branch $a$ on that side of its connection with the said cross shunt $b$, while the other coil $e$ on the other side of said cross shunt remains in the circuit; and that, with the said armature $f$ in its middle or neutral position, and with the current strength and the resistance of each of said coils $e$ $e$ so proportioned that enough current is allowed to pass through one of the said coils (and through the cross shunt $b$) to energize its core $d$ sufficiently to attract the armature $f$ upon the arrival of a current from either side of the main circuit $a$ $c$ such current will first pass through the first one of said coils and by attracting the armature $f$ to make contact with the said branch $g$ on that side of cross shunt $b$, the circuit will be instantaneously cleared from the resistance of such coil $e$ for the passage of such current through the said cross shunt $b$; and further, that the second coil of the pair remaining in the main branch $a$ in the circuit behind the cross shunt $b$, together with the first coil of the pair belonging to the next similar cross shunt on that side of the circuit (as will be better understood from Fig. 4) no appreciable amount of such current will be allowed to pass on over the circuit to cross over at the next cross shunt.

As will be shown later, each of the cross shunts in a circuit as herein described, may have in connection a generator for selecting or other currents, and the said armature $f$ may then be employed to perform another function than the aforementioned, namely, in selecting the side of the circuit to which such currents are desired to be sent, which is a manual operation, simply throwing the said armature $f$ over to that side, thereby shunting the coil $e$ on that side of the cross shunt $b$, thus clearing the circuit of this resistance on that side, while on the other side there remain, as before explained, two such coils intervening between cross shunt $b$ and the next cross shunt in the circuit on the opposite side. This will be further shown, as well as means for locking the said armature $f$ in its position after having selected the desired side of the circuit when any currents generated at this point of such main circuit are desired to be sent.

With the foregoing description of Fig. 1, the form of the same device shown in Figs. 2 and 3 will be understood. In Figs. 2 and 3, the cores $d$ and the armature $f$ between, and parallel to each other, and one or both ends of said cores $d$ shaped so as to shorten the air gap in the magnetic circuit between each of the said cores $d$ $d$ and the armature $f$, thus requiring a smaller current flowing through the said coils $e$ $e$ to operate it, or, what is the same, a proportionately higher resistance may be employed and can be made effective in the circuit by the said coils $e$ $e$.

In Fig. 2 the middle position of the armature $f$ is made stable by making the lower end square or concave, shaping this end to the form of a narrow base resting or rocking to either side in the flat bottom of a retaining seat $h$, which electrically connects with the embraced end of the armature $f$ and the cross shunt $b$ and the main branch $a$ at a point between the coils $e$ $e$.

In Fig. 3 is shown a form of the resistance device employing a pendent armature $f$ pivoted and making electrical connection with the main branch $c$ at its upper end, the middle or neutral position being insured by its weight, and swinging pendulum like to either of its contact positions on both sides by the attraction of one or the other of the two cores $d$ $d$, contact being effected through either of the two springs $g$ $g$ which hold the said armature $f$ in its shunting position when once attracted to that side. The said springs $g$ $g$ are made of steel or iron, and the restoring of the armature $f$, in this form of the device, is effected by releasing the frictional engagement of said springs $g$ $g$ against said armature $f$. This is effected by an electromagnet $i'$ in an independent battery circuit $i$ through which a current is allowed to pass when restoring of the said armature $f$ is desired, the said electromagnet $i'$ attracting the said springs $g$ $g$, and releasing the armature $f$, which falls to its middle position out of contact with the said springs $g$ $g$, which will be further shown later. In other respects, the functions and operations are the same as has been described in connection with Figs. 1 and 2; and either form of the device as may be most suitably employed can be used, although for convenience for the purpose of illustration, I may in the following mostly show the resistance device in the form shown in Fig. 1.

Fig. 4 is a diagram showing an electric circuit which may be composed of any number of cross shunts (five such cross shunts being shown in the diagram) connected at their respective terminals to the main branches $a$ and $c$. At their junction with the main branch $a$, each of such cross shunts $b, b', b^2$, etc., is provided with a pair of resistance coils, such as just described in the circuit of the main branch $a$, one of such coils on each side of its junction with the several cross shunts. A pair of such resistance coils $e$ $e$ with their shunting armature $f$ and other parts, have been already described in connection with Figs. 1, 2 and 3. The complete device for each cross shunt will hereafter for the sake of simplicity, be designated by the letter A, A', A², etc., and may be of either of the forms that has been shown and described. In Fig. 4 each of the several cross shunts $b$, $b'$, $b^2$, etc., are also shown provided with a current generator B, B', B², etc., being in this case a battery which may be switched into the circuit of the same by their respective contact keys $k$, $k'$, $k^2$, etc., whereby currents may be sent into the main circuit from any of the said cross shunts comprised in such circuit, and to the right or left hand of the circuit as may be desired. The method employed, as has been stated, is to throw the shunting armature $f$ of the resistance device A of that particular cross shunt in which such current is generated, over into its shunting position on the side of its resistance device it is desired to send such current, thereby shunting its resistance coil out of the circuit on that side of its connection with said cross shunt. If, we will say, that part of the circuit in which the cross shunt $b^2$ is located is in its normal condition of rest, that is, with the resistance device of the cross shunt $b^2$ and also those of the adjoining ones, $b'$ and $b^3$, on either side of it, in the circuit with their respective shunting armatures $f$ in their middle or neutral position, and the current generator or battery B² is switched into the circuit of the cross shunt $b^2$ by depressing the key $k^2$, sending or attempting to send a current into the circuit from this point, it will be seen that the condition of the circuit on both sides of it is alike and that half of the current would flow or tend to flow to the right and return through the cross shunt $b^3$, and the other half of such current tend in the same way, to return through the cross shunt $b'$ at the left; but the combined resistance in the circuit of the coils $e^5$ and $e^6$ intervening between the current source and the cross shunt $b^3$ to the right, and the coils $e^4$ and $e^3$ to the left is sufficiently high to prevent any part of such current, practically speaking, from passing in either direction. But, as intimated, it was desired from the cross shunt $b^2$ to prepare the adjacent part of the circuit for the passage of currents from the cross shunt $b^2$ to any of the other cross shunts in such circuit, either to the right or left hand side of the same, and this is effected by shunting the intervening resistance coils out of the circuit in the direction in which such circuit is desired to be employed. If this direction is to the left, then, by first throwing the armature $f^2$ of the resistance device A² over to its shunting position to the left, as indicated by the dotted line, thereby shunting the coil $e^4$ out of the circuit and now depressing the key $k^2$, connecting the generator branch of the cross shunt $b^2$ with the main circuit, its current generator or battery B² is now able to overcome the remaining resistance $e^3$, as was explained, and attract its shunting armature $f'$, which is thrown over into the position, which is indicated by the dotted line, shunting the coil $e^3$ out of the circuit also, and the circuit is now cleared of all interposed resistances to the passage of a current over that part of the same consisting of the cross shunts $b^2$ and $b'$ and the intervening parts of the main branches $a$ and $c$, to which part of the said circuit such current will be confined by the two resistance coils remaining between this part of the circuit and the adjacent cross shunts $b$ and $b^3$ on both sides.

It will now be evident that if it had been desired to prepare the circuit to the right, instead of throwing the armature $f^2$ of the resistance device A² to the left, as in the first instance, it should be thrown over in the opposite direction, shunting the coil $e^5$, and the current would then pass through the coil $e^6$, attracting its armature into the position shunting the same, the circuit would then be cleared of all of its interposed resistance over the said shunt $b^2$ and $b^3$, and the passage of the current would then be confined to this part of the circuit in the same manner by the remaining resistances on both sides; and that the same operation can be performed from any one of any number of cross shunts comprising such a circuit, and further, upon the circuit being cleared of resistances for the passage of currents from one cross shunt in the circuit either to the left or right hand side of the same, that, if this nearest cross shunt is opened or switched out of the circuit, together with its resistance device in the circuit, the same operation can be repeated for this also, extending the circuit for the passage of the succeeding current impulse to the second nearest cross shunt, which again can be opened, or, with its resistance cut out of the circuit; the circuit is again extended for the passage of another current impulse operating in the same way on the third cross shunt, and so on for any number of such cross shunts desired, and the method and devices employed will be described in the following.

The diagram, Fig. 5, shows one of the cross shunts $b$, $b'$, $b^2$, $b^3$, of Fig. 4, with an inductively operated switch consisting mainly of an armature $j$ pivoted and electrically connected with the lower part of the cross shunt $b^2$ at its lower end, and a coil and its soft iron core $i^x$ in the circuit of cross shunt $b^2$, which, upon the passage of a current in either direction, will attract the said armature $j$. There are also, the two branches $h^x$, $h'$, both of which connect with the main branch $a$, one on each side of the resistance device $A^2$, as shown, and terminating with the contact springs $h^2$ and $h^3$, which are in the form shown, with their contact points normally separated from each other by their tension. The springs $h^2$, $h^3$, are brought in contact with each other by the tappet $h^4$ on the armature $j$, which tappet is of hard rubber, or the armature $j$ is by other means insulated from the said branches $h^x$, $h'$, which, through the contact of said springs $h^2$, $h^3$, shunts both coils of the resistance device A out of the circuit of the main branch $a$ when the armature $j$ is in the position of the dotted line. As shown, the resistance device $A^2$ and the position of the armature $j$ are in the position of rest, with both coils of the resistance device A in the circuit, and the armature $j$ closing the cross shunt $b^2$, and with the said shunting branches $h^x$ $h'$ open.

Referring to Fig. 4, if all of the cross shunts $b$, $b'$, $b^2$, $b^3$, etc., of such a circuit were provided with means for opening them, as in Fig. 5, and also with such shunting branches $h^x$ $h'$, the latter, when the cross shunt of the circuit to which they belong is opened, will be closed, thereby short circuiting the entire resistance device belonging to that cross shunt, and if the shunting armature $f^2$ is thrown over to shunt the coil of the resistance device on that side of the cross shunt in the direction in which it is desired to prepare the circuit for the passage of currents, which as before, we will say is to the left, and the key $k^2$ is depressed an instant, as before, the current impulse will pass through the resistance coil $e^3$, and the nearest shunt $b'$, throwing the shunting armature $f'$ into its shunting position, shunting the said resistance coil $e^3$ out of the circuit, as was described; said current impulse will now also pass through the coil $i^x$, at said point $b'$, corresponding to the coil $i^x$, at shunt $b^2$, Fig. 5, thereby attracting the armature $j$, throwing it over into the position of the dotted lines, in which position its insulated tappet $h^4$ will close the shunt $h^x$ $h'$, thereby cutting out the resistance $A^2$, and at the same time, open the contact of its other (electrically connected) tappet $b^e$ with the spring $b^d$, whereby the cross shunt $b'$ is opened, and the cross shunt $b$ is now the nearest closed cross shunt to that in which the current is generated, and with both of the resistance coils of the cut out cross shunt $b'$ out of the circuit. Now if we suppose the main circuit extends beyond cross shunt $b$ with any number of similar cross shunts which are each provided with similar means for cutting them out of the main circuit, another current impulse sent out from the current generator $B^2$ will open and cut its resistances out of the circuit in the same manner as was described for the cross shunt $b'$; and this can be repeated for as many cross shunts as may be desired until the cross shunt desired to be reached is the one nearest to the current source of those remaining in the circuit on that side of the same.

The desired point of the circuit having been selected, currents can now be sent in either direction over the main branches $a$ and $c$ between the said two points, with all of the intervening resistance devices cut out of the same, and regardless of how many of the intervening cross shunts have been opened, there remains in the intervening circuit none but the resistance of the conductors, with the exception of the first resistance coil of the selected cross shunt, which still remains; but one current impulse will throw the shunting armature of the resistance device belonging to this cross shunt, over into the position to shunt said coil out of the circuit also. This current impulse, as well as all other and succeeding currents for other purposes, must be of a lower current strength or of shorter duration so as not to throw the armature $j$, as shown in Fig. 5, over into the position to open the cross shunt in which it is placed, and for this purpose, this armature $j$ is made somewhat heavier so as to give it the required inertia. The latter description applies to the inductively operated switching or cutting out arrangement as shown in Fig. 5, or any form of the same which may be employed, in which currents operate such switching arrangements in both directions. Later, however, will be shown a polarized device for this purpose by which the selecting operation will be performed by currents in one direction only, and currents of any strength desired can be sent over the selected part of the circuit in the opposite direction, without affecting the selecting devices of the circuit. Such polarized switching device is equally adapted to open the shunts shown in Figs. 4 and 5, but would require generators of currents of both polarities as will be shown later.

I will now describe the means for restoring the circuit referring to Fig. 6. The cross shunt $b$ connected to the main branches $a$ and $c$ with its resistance device A, coil $i^x$, shunting branches $h^x$ $h'$, and armature $j$ with its insulated tappet $h^4$, which in one position opens the branch $h^x$ $h'$, are all practically the same as the cross shunts described in connection with Figs. 4 and 5. The armature $j$ is pivoted in the middle and is electrically connected with the main branch $c$ at its middle and pivotal part, and connects the shunt $b$ with the said main branch $c$ by contact, in the position shown. The said armature $j$ is held to its two extreme positions by its weight predominating above the fulcrum. A third main branch $n$ similar to the main branch $a$, is provided with like cross shunts $b^n$, resistance devices $A^n$, main circuit shunting branches $h^n$ $h^{n\prime}$, and coils $i^n$, which alternately with the coil $i^y$, change the position of the common armature $j$, which alternately makes contact with the cross shunts $b$ and $b^n$, one of which is employed to restore the connection of the other, the armature $j$ making contact with one, while it opens that of the other, and holds the main line or branch shunt $h^x$ $h'$ open, while those of the other branch are allowed to close. This method of restoring will be further shown and described in connection with the polarized switching device in place of the coils $i^y$ and $i^n$. A circuit such as shown in Fig. 6, may be provided with current generators for each cross shunt as the battery B and contact keys $k^a$ and $k^n$ as shown, for sending currents over the circuit to the nearest closed cross shunts in the circuit to the right or left of it, either for selecting, we will say, over the branches $a$ and $c$ by the key $k^n$, or for restoring the opened cross shunts connecting said branches $a$ and $c$ over the branches $n$ and $c$ by depressing the key $k^a$.

In the diagram Fig. 7 is shown the manner of opening the cross shunts $b$ $b^{10}$, etc., in a circuit, such as shown in Figs. 4 and 5, by employing a polarized switching device in place of the magnet $i^x$ and armature $j$ as therein shown, such polarized switching device being shown more fully in Fig. 8. In Fig. 7 the permanent magnet $m$ of Fig. 8 is left out for the sake of clearness, showing only the two cores and their respective coils $i^o$ $i^o$, and the armature $j$, which has its upper end weighted to insure holding it to its positions, although the pull of the permanent magnet on the end of the said armature $j$, through that one of the soft iron cores of the same which is nearest to its core, tends to hold the said armature $j$ to either of its two positions even when no current is flowing. The said armature $j$ is electrically connected at its central or pivotal point to the terminal of one branch of the cross shunt $b$, which branch is indicated by $b^{10}$, and makes contact, when in the position shown, with the other terminal in said branch $b^{10}$, having the coils $i^o$ $i^o$, in circuit and connects through the tensionally closed key $k^{10}$ with the resistance device A, belonging to this cross shunt, and the main branch $a$, the other end of this branch $b^{10}$ connecting through the other key $k$ with the main branch $c$ as shown. A current generator is provided for each of the cross shunts in such circuit for sending current impulses of either polarity into the circuit for the purpose of selection as has been described, such current generator being indicated by a battery B and the contact keys $k$ and $k^{10}$ whose connections with the said battery B are such that, when both of the said keys $k$ $k^{10}$ remain closed as shown, the shunt $b$, that is, the said branch of the same, $b^{10}$, is closed through the coils $i^o$ $i^o$ of the polarized switch, and an incoming current from either side of the circuit, as has been described, will pass through said coils $i^o$ $i^o$, energizing its cores and attracting either end of the armature $j$ according to the polarity of such current; thus, incoming currents of one polarity, when the armature $j$ is in the position of rest as shown, will not change its position, leaving the cross shunt in which it is placed, closed, and the shunting branches $h^x$ and $h'$ (whose functions were described in connection with Figs. 5 and 6) open, while if the incoming current is of the opposite polarity, it will change the armature $j$ over to its opposite position, thereby opening its contact with the coil terminal of the said branch $b^{10}$, opening the cross shunt, and its insulated tappet $h^4$ will close the springs $h^2$ and $h^3$, thereby shunting the resistance device A out of the main branch $a$, as has been explained. The further arrangements of the battery connections are such that the outgoing currents of one polarity sent into the circuit by depressing the key $k^{10}$ will pass through the cross shunt $b$, the other branch of the same, $b^{10}$, which has the coils $i^o$ $i^o$ in circuit, being then open. Upon depressing the key $k$, currents of opposite polarity will be sent into the circuit, and this will pass through the branch $b^{10}$ with the coils $i^o$ $i^o$ in circuit but the polarity being such as not to change the position of armature $j$, or to make any change in the selective parts of the circuit at this point.

Referring to Fig. 8, it will be seen, that the polarized device, which will in the following descriptions be designated by the letter C, is of the nature of a polarized ringer as ordinarily used in telephone instruments and will be readily understood without further description of the same. It will be noticed further on that instead of closing (or opening) the shunting branches of the armature $j$ directly through the tappet $h^4$, and also the same in opening and closing the shunt $b$ by its own contact, the said armature $j$ may only be employed through its tappet $h^4$ to close a pair of springs similarly as is shown in Figs. 7 and 8, but such being the terminals of an independent electric circuit having a battery or other current source, whose circuit upon being closed by such pair of springs as $h^2$ $h^3$ can be made to operate both the closing or opening of the cross shunt $b$, the closing of the shunting branches $h^x$ $h'$, and perform other operations too numerous and requiring more power than the armature $j$ directly could be made to overcome. The same method can also be applied where the several cross shunts of the circuit are opened by currents of either polarity as shown in Fig. 5. Such a circuit as shown and described in connection with Fig. 4, and the inductively operated cross shunts connecting the two main branches of the same (which cross shunts, with several forms of the inductive means for such operation in circuit, and which are shown and described in the subsequent figures) will require an additional means for restoring such cross shunts to their normally closed condition, as when the circuit, or the part of the same in which a particular cross shunt is located, is at rest. This will be required whether the opening of such cross shunts is effected by the polarized inductive switch such as described in Figs. 7 and 8, or by means of the simple electromagnet form of the switching device, as shown in Fig. 5, and for which the method of restoring has been shown by Fig. 6. The method employed for operating the several cross shunts of the circuit when the polarized switching device already described is employed, may essentially be the same as this, and is shown by the diagram Fig. 9, which represents one of the several cross shunts and the adjacent part of the main branches of the circuit. Similar to Fig. 6, one of the main branches of the circuit is composed of a pair of similar and separate conductors $a$ and $n$, each with its resistance device $A^a$ and $A^n$, main circuit shunting branches $h^a$ and $h^n$, and the separate cross shunts for each, $b^a$ and $b^n$, which alternately connects with the other main branch of the circuit $c$, through the switching or contact lever $l^x$ and the part of the cross shunt $b^c$, which may be considered as a part of the main branch $c$, and which alternately connects with the terminals of the pair of cross shunts proper, $b^a$ and $b^n$, through the said contact lever $l^x$. The polarized switching or shunt operating device C is placed in the circuit in the part of the cross shunt $b^c$ and operates by currents of either polarity coming in over the main circuit from other cross shunts (or stations) on either side of it; and over either of the couple of conductors $a$ or $n$ constituting one of the main branches of such circuit, according to which member of the pair has its cross shunt $b^a$ or $b^n$ contacted with the said branch $b^c$ through the said switch lever $l^x$, so that the polarized switching device C is always under control, through one or the other of the said members of conductors $a$ or $n$, from any one of the other cross shunts in the circuit as has previously been described by passing currents of the proper polarity to throw the polarized armature $j$ of the said device C over into its opposite position, thereby changing the electrical connection of the cross shunt from that member of said pair to the other; and this may then be employed to pass a current through such cross shunt of a polarity to throw the said armature $j$ back to its first position, restoring its connection with first member of the pair. As previously explained, currents of one polarity may be passed through such cross shunt without effecting any change in the contacts, and this is true whichever of the two members of conductors such current arrives from and passes through that part $b^c$ of the cross shunt having the switching device C in circuit, and common to both of the said members. As both of such members $a$ and $n$ of the pair and their connections are alike, it is immaterial which of them is employed for selection or restoring, but with reference to the diagram Fig. 9, we will consider $a$ as employed for selecting and the other member $n$ for restoring. The cross shunt belonging to the selecting member $a$ may then be provided with a manually operated arrangement for further selection, such cross shunt $b^a$ being divided into two separate branches $b^{10}$ and $b^{20}$, either of which branches may be employed at will by changing the lever switch $b^{30}$ up or down. The said lever switch $b^{30}$ is spring held upwardly, and is held down to its lower position, which is its normal position of rest, by a detachable weight, such as the telephone receiver (not shown), closing the branch $b^{10}$, and when the said detachable weight is removed, it presses upward closing the branch $b^{20}$, (the branch $b^{10}$ may be the signaling circuit and the branch $b^{20}$ the speaking and listening circuit of a telephone instrument), and it will be evident without further illustration, that any of the forms of cross shunts herein shown, are adapted for a similar selective arrangement, whether such is shown in connection with the same or not. The contact lever $l^x$ is weighted on the opposite end to where contact is made, and normally this end is down, holding the contact springs of the main circuit shunt $h^n$ closed, while those of the main circuit shunt $h^a$ remain open. The polarized armature $j$ is also shown in the position of rest of the circuit, leaving the contact springs $m'$ of the relay circuit $m^2$ open. This circuit $m^2$ is provided with a battery B, and the coil $m^4$ wound upon the upper half of the core $m^3$, is in the circuit of the same. An incoming selecting current passing through the coils of the polarized device C, will throw the armature $j$ over into its opposite position, closing the springs $m'$ of the said relay circuit, and the current flowing will energize the core $m^3$ and attract the end of the contact lever $l^x$, thereby changing the contact from that of cross shunt $b^a$ to the cross shunt $b^n$, and allow the contact springs in the main circuit shunt $h^n$ to open while closing the contact springs of the main circuit shunt $h^a$. The selecting member $A^a$ of the pair with its cross shunt $b^a$ is now cut out and will remain so as long as the armature $j$ remains in this position, holding the contact springs of the relay circuit $m^2$ closed, and the said member $a$ has no connection with the main branch $c$ at this point of the circuit and has its shunting branches $h^a$ closed, whereby its resistance device $A^a$ is short circuited, and presenting no resistance to currents passing over the said member $a$ past this point; the other member $n$ now being connected with the main branch $c$ through the coils of the polarized switching device C, and having its resistance device $A^n$ in circuit, (its shunting branches $h^n$ being open) a restoring current arriving over the said member $n$ from either side, will be compelled, as has been explained, to pass through the shunt $b^n$ and $b^c$, throwing the polarized armature $j$ back to its first position, and thereby allow the contact springs of the relay circuit $m^2$ to open. The core $m^3$ being now no longer energized, the said contact lever $l^x$ is released, and falls back by its weighted end into its first position of rest, and restores the contact of the cross shunt $b^a$ of the said member $a$, and closes the shunting branches $h^n$, while those of $h^a$ are allowed to open. The said contact lever $l^x$ has its weighted end properly insulated at the point where it presses against the terminal pair of springs of the shunting branches $h^a$ and $h^n$. The said contact lever $l^x$ carries by a light projecting stem the "busy" signal $o$, to indicate that the selecting cross shunt $a$ is cut out.

A secondary circuit $p$ is shown with the coil $p'$ wound upon the lower half of the core $m^3$, and upon the opening of the relay circuit $m^2$ an induced current impulse is set up in the said circuit $p$, which energizes the core $p^2$ which, as shown, is placed between the two resistance devices $A^a$ and $A^n$, restoring their respective armatures $f$, if one or both of the same should be in their shunting position which has been explained. Each of the cross shunts in such a circuit may have current generators in connection, substantially in the same manner as is shown in Fig. 7, switched into the circuit at some point in the part $b^c$ of each cross shunt.

A circuit such as has been described but with the cross shunts of the same having yet a different arrangement, is shown in Fig. 10, one such cross shunt with the adjacent main branches being shown in the diagram. Like the last foregoing, a pair of conductors are employed, but instead of separate resistance devices and cross shunts for each of the conductors $a$ and $n$, between which the connection of the main branch $c$ is alternately switched, this arrangement consists virtually of a single cross shunt $b$ having in circuit the polarized switching device C (acting through a relay circuit $m^2$ like the foregoing) and the resistance device A and the relay operated switching lever $l^s$ which switches this terminal of the cross shunt $b$ from one to the other of the said conductors $a$ and $n$, obviating the use of one resistance device at each station and the main circuit shunting branches $h$ as previously shown, the main branch conductors $a$ and $n$, with this arrangement, closing automaticaly through their respective contact springs $r^a$ and $r^n$ (by the tension of the springs) upon the withdrawal of the contact parts of the said switching lever $l^s$ from between the converging contact points of said spring $r^a$ and $r^n$. The said contact lever $l^s$ is weighted on one end by the soft iron piece $l^3$, by which this end is raised by the attraction of the core and coil $m^5$ in the relay circuit $m^2$ when the same is closed by the polarized armature $j$, and drops again by its weight into the position shown which is that of rest of the circuit when the said relay circuit $m^2$ is allowed to open by the throwing back of the said armature $j$ into its first position by an incoming current of the proper polarity flowing through the shunt $b$ as has been explained. The construction of the said contact lever $l^s$ is shown more plainly in the diagram $10^a$, and consists of two parts $l'$ and $l^2$ insulated from each other by fiber or other suitable material shown by $l^5$. The ends which engage the pair of springs $r^a$ and $r^n$ are bent at right angles to the main body of the lever as shown (this is not essential as they will serve as well if straight). This contact lever $l^s$ may be pivoted in the ordinary way by the two tapering screws $l^4$ $l^4$ which are the separate electrical connections of the two insulated halves of the said lever $l$, such electrical connection being continued separate through the two branches $g$ and $g'$ to the resistance device A, Figs. 10 and $10^a$ coming together through the two coils of the same and, continued through the cross shunt $b$, the other terminal is connected to the main branch $c$, by which it will be evident that, as the said contact lever $l^s$ in its two opposite positions engages and spreads apart one of the pair of springs $r^a$ or $r^n$, the two sides (left or right) of the conductor $a$ or $n$ with which the said contact lever is engaged is continued separately for both incoming and outgoing currents through their respective insulated sides $l'$ and $l^2$, and branches $g$ and $g'$ and to their respective coils of the resistance device A and cross shunt $b$ in the same manner as has been shown for the circuit employing only one single conductor for both of its main branches as in Fig. 4. The pair of springs $r^a$ and $r^m$ not engaging with the said contact lever $l^s$, as $r^n$ Fig. 10 in the position shown of the said lever $l^s$, closes upon each other and the electrical connection of the conductor $n$ continues intact, without any resistance left in the same, past this point of the circuit.

The relay circuit $m^2$ is made to include the the coil and core $p^3$ which when a current is passing, attracts a pendent pawl $p^4$ which is thus made to engage with the projection $b^5$ upon the hook switch $b^3$ (also shown in Fig. 9) locking the same to its lower position so long as the relay current is passing, that is, so long as the cross shunt $b$ and $b'$ is connected with the restoring conductor $n$. As soon as the shunt $b$ and $b'$ is restored to its connection with the selecting conductor $a$ as has been explained in connection with Fig. 9, the said pawl $p^4$ falls back to its pendent position again as the said relay circuit is then opened again, as has also been previously explained. The two branches of the cross shunt $b'$ and $b^2$ alternately in the circuit by the upper and lower position of the switch lever $b^3$ are similar to the arrangement shown in Fig. 9, and the current generator or battery B is placed in the circuit of the branch $b^2$ as shown, which together with the battery circuit and pole-changing keys $k$ $k'$, are for transmitting selecting and restoring currents to either side of the circuit as has been previously explained, and will be understood without further description. The locking of the switch lever $b^3$ just described, keeping the said branch $b^2$ open, prevents the passage of such currents from this point so long as this part of the circuit is employed from some other part of the same.

I claim:

1. An electrical selective system, comprising a main circuit having between its two branches a plurality of cross shunt connections and having at the intersection of each shunt with one branch a symmetrical resistance device consisting of coils having their opposite end connected respectively to the contiguous parts of the same branch of the main circuit and having each cross shunt connection, between the two branches of the main circuit, connected to the windings of the resistance coils at a point between their opposite ends, and means for successively extending the main circuit past the several shunts.

2. An electrical selective system, comprising a main circuit having between its two branches a series of cross shunt connections and having at the intersection of each shunt with one of its branches a symmetrical resistance device consisting of coils having their opposite ends connected respectively to the contiguous parts of the same branch of the main line, and having the series of cross shunt connections each connected at one end to the coils at points between their opposite ends and a series of cut-out devices between the other ends of the cross shunts and the other branch of the main line, whereby each cross shunt is successively opened by successive impulses along the main line until the circuit of the desired cross shunt is reached.

3. An electrical selective system, comprising two main line branches and a return branch, a series of cross shunt connections between each main line branch and the return branch, a series of resistance devices located at the intersection of each main line branch and cross shunt, each resistance device consisting of two coils, the opposite ends of which are connected to the contiguous parts of the main line branches and the cross shunts being each connected to the resistance devices between their two coils, a double acting and oppositely acting cut-out device between the several cross shunts and return branch, said double acting cut-out device opening the cross shunt on one side of the main return branch and closing the corresponding cross shunt on the other side, and a circuit closer for each main branch for effecting selection and restoring the parts to the position of rest.

4. An electrical selective system, comprising two main line branches and an intermediate return branch, a series of cross shunt connections between each main line branch and the intermediate return branch, a series of resistance devices located at the intersection of each main line branch and cross shunt, each resistance device consisting of two coils having their opposite end connected to the contiguous parts of the main line branches and the cross shunts being each connected to the resistance devices between their two coils, a cut-out device between the several cross shunts and return branch for each main line branch, the cut-out device for one main line shunt acting reversely to the cut-out device for the other main line shunt, one being arranged to restore the other, and a separate circuit closer for each main line branch.

5. An electrical selective system, comprising a main circuit having between its two branches a cross shunt connection and having at the intersection of the shunt with one branch, symmetrical resistance device consisting of two coils having their opposite ends connected respectively to the contiguous parts of the same branch of the main circuit and having one end of the cross shunt connection connected to the resistance device between its two coils and a double acting cut-out for the other end of the shunt arranged to both open the cross shunt and cut-out the coils of the resistance device from the main line.

6. An electrical selective system, comprising a plurality of cross shunts respectively connecting at each station two main branches of an electric circuit one of which is a common return branch and the other being composed of any number of separate conductors interchangeably connected to the common return branch through their respective cross shunts at each station, a symmetrical resistance and inductive device consisting of a coil in two parts for each conductor at each station, having the cross shunt connection to the winding of the coil at a point between the two parts and having the opposite ends connected respectively to the contiguous parts of their respective conductors, a coil shunting armature interposed between the two parts of the combined resistance and inductive coil, an inductive means in the circuit of each of the several cross shunts operated by current impulses from the main circuit opening the connection of its shunt with the common return branch and interposes that of one of the other members of interchangeable conductors constituting the other branch of the circuit.

7. An electrical selective system comprising a main circuit having a series of cross shunts one for each station, connecting two main branches one of which is a common return and the other being composed of a plurality of interchangeable conductors or members, each having for the several stations two terminal springs, for the two sides of the circuit pressing against each other and normally closing the several members or conductors when having no cross shunt connection at this point past each station, a symmetrical resistance device at each station consisting of a coil, the opposite ends of which are inserted between the terminal springs of one of the members constituting one of the main branches, to respectively contact with the two sides of the circuit, and having the cross shunt connection with the coil at a point between its opposite ends, and an inductive means in the circuit of each cross shunt operated by current impulses from the main circuit changing the connection of the single return branch through its shunt connection from one to the other of the members or separate conductors constituting the other main branch of the circuit.

8. An electrical selective system, comprising a main circuit having a series of cross shunts, one for each station, connecting two main branches one of which is a common return and the other being composed of a plurality of interchangeable conductors or members, each having for the several stations two terminal springs, for the two sides of the circuit pressing against each other and normally closing the several members or conductors when having no cross shunt connection at this point past each other, a symmetrical resistance device at each station consisting of a coil the opposite ends of which are inserted between the terminal springs of one of the members constituting one of the main branches, to respectively contact with the two sides of the circuit and having the cross shunt connection with coil at a point between its opposite ends and a polarized inductive means in the circuit of each cross shunt requiring for its operation current impulses of one polarity and which is inoperative for current impulses of opposite polarity.

9. The selective resistance device, comprising the junction of three conductors or branches, two of which may be the contiguous parts of the main branch of a circuit and the third branch a shunt, a combined resistance and inductive coil in each of the two branches constituting the main circuit, an oscillating coil-shunting armature interposed between the two coils having pivotal or rocker seat electrical connection to the junction of the three branches of conductors and in its two extreme and opposite positions making contact with one or the other of the two branches of the main circuit at a point beyond its coil shunting the coil on the side to which it is attracted by the energizing of the coil upon the first arrival of a selective current impulse from that side of the circuit, and means for restoring the armature from either of its shunting positions to its neutral or middle position.

10. An electrical selective system, comprising a main circuit having between its two branches a series of cross shunt connections, one of the branches consisting of a plurality of interchangeable members, one of which is always connected to the other or common return branch through the several shunt connections and having at the intersection of each cross shunt with one of the interchangeable member a symmetrical resistance device consisting of a coil wound in two parts having its opposite ends connected respectively to the contiguous parts of one of the members of which one of the main branches of the circuit is composed and having the cross shunt connection to the coil at a point between its opposite ends, a coil shunting armature interposed between the two parts of the coil, shunting that part of the same out of the circuit on the side from which an incoming selective current impulse arrives, leaving two such parts of coils remaining in the main circuit between the cleared cross shunt and the nearest shunt in the circuit beyond it.

11. An electrical selective system, comprising a main circuit having between its two branches a series of cross shunt connections, one of the branches consisting of a plurality of interchangeable members one of which is always connected to the other or common return branch through the several shunt connections and having at the intersection of each cross shunt with one of the interchangeable members a symmetrical resistance device consisting of a coil wound in two parts having its opposite ends connected respectively to the contiguous parts of one of the members of which one of the main branches of the circuit is composed and having the cross shunt connection to the coil at a point between its opposite ends, a suitable current source in connection with each of the several cross shunts, a coil-shunting armature interposed between the two parts of the double coil shunting the part of the coil out of the circuit in the direction in which an outgoing selective current is desired to be sent, means for throwing the coil-shunting armature to the proper shunting position for the outgoing current, two such parts or coils remaining in the circuit behind the applied current to the nearest cross shunt behind it and one such part remaining in the circuit in the direction of the outgoing current, means for shunting the remaining part of the coil out of the circuit clearing the same to the nearest cross shunt connection, means for successively shifting the nearest and then the following cross shunts together with their respective resistance devices to another member of the interchangeable conductors of which one of the main branches is composed, and means for restoring through the other member and in a similar manner the cross shunt connections and their respective resistance devices when desired.

12. An electrical selective system, comprising a main circuit having between its two branches a plurality of cross shunt connections one of the branches consisting of two interchangeable members one of which is always connected through the several common cross shunts to the other single or common return branch and having at the intersection of each common cross shunt with one of the interchangeable members a symmetrical resistance device consisting of a coil in two parts having the shunt connection and a coil-shunting armature connected to the winding of the coil at a point between the two parts of the double coil the opposite ends of which respectively are interchangeably connected to the opposite sides of the circuit of one or the other of the two members of the interchangeable branch, a contact lever consisting of two longitudinal and insulated parts respectively connected to the opposite ends of the resistance coil and constituting the contact terminals of the same, a pair of contacts and circuit closing springs for each member at each station, terminals for the opposite sides of the circuit, and inductively operated means for switching the contact lever from one member and inserting the insulated contact parts of the same between the self-closing contact springs of the other member, the connection of one member to the common shunt being restored through the other.

13. An electrical selective system, comprising a main circuit having between its two branches a plurality of cross shunt connections and having at the intersection of each shunt with one branch a symmetrical resistance device consisting of coils having their opposite ends connected respectively to the contiguous parts of the same branch of the main circuit and having the cross shunt connection, between the two branches of the main circuit, connected to the windings of the resistance coil at a point between its opposite ends, the several cross shunts for a part of their length consisting of two branches, an upwardly spring-held selective contact lever held to its lower position by a removable weight and having pivotal or otherwise electrical connection with the other and single terminal of the cross shunt, its upper and lower positions contacting respectively with two branched terminals of the cross shunt, and inductively operated means for temporarily locking the contact lever to its lower position.

14. An electrical selective system, comprising a main circuit having between its two branches a series of cross shunt connections, a plurality of interchangeable members for one of the main branches of the circuit interchanging with each other through the several cross shunt connections with the other single or return branch, a symmetrical resistance device consisting of coils having their opposite ends respectively connected to the contiguous parts of the circuit of one of the interchangeably operated members constituting one of the main branches of the cricuit, and having the cross shunt connection and a coil-shunting armature connected to the winding at a point between the two coils, a continuous current generator in connection with each cross shunt whose opposite pole branches having respectively two contact points approaching each other but having a suitable space between them, two springs respectively for the two terminals of the open cross shunt interposed between a contact point from each of the opposite generator pole branches, both springs normally contacting with the same generator pole branch through which the cross shunt is closed with the generator out of the circuit but changed contact of one of the cross shunt springs to the opposite generator pole branch brings the generator into the shunt circuit with currents in one direction and with the change of contact of the other terminal spring the generator is connected to the shunt in the opposite direction, and means for operating the two cross shunt terminals (*k k*, Figs. 9 and 10).

15. An electrical selective system, comprising a main circuit having between its two branches a series of cross shunt connections each of which has in connection a current impeding means in the main circuit between each of the several cross shunt connections capable of being shunted or cut out of the main circuit in the direction of the same in which the selection of a cross shunt connection is desired, and means for cutting or shunting such current impeding means out of the circuit.

16. An electrical selective system, comprising a main circuit having between its two branches a series of cross shunt connections each of which has in connection a current impeding means in the main circuit between each cross shunt connection, the cross shunt together with the current impeding means capable of being cut out of the circuit, and inductive means in the circuit of each cross shunt for successively cutting all cross shunt connections together with their respective current impeding means out of the main circuit between the cross shunt in which the selecting current is applied and the circuit of the cross shunt to be selected.

17. An electrical selective system comprising a main circuit having between its two branches a plurality of cross shunt connections, one of the branches being composed of a plurality of interchangeable members or similar and separate conductors, while the other branch of the main circuit with its several cross shunt connections constitutes a common return branch, current impeding means in the main circuit between each cross shunt connection which together with the cross shunt is capable of being cut out of the circuit of one of the several interchangeable members of the plurally constituted branch of the main circuit and inserted into the circuit of another member of the same branch, and inductive means in the circuit of each of the several cross shunts for successively cutting all cross shunt connections together with their respective current impeding means out of the circuit of one member of the plurally constituted branch of the main circuit and inserting the same into the circuit of another member of the same branch between the cross shunt in which the selecting current is applied and the desired cross shunt.

NELSON L. TOLVSTAD.

Witnesses:
N. S. BOSOM,
T. W. FELLERS.

---

Copies of this patent may be obtained for five cents each, by addressing the "Commissioner of Patents, Washington, D. C."